United States Patent [19]

Napier

[11] Patent Number: 4,572,157
[45] Date of Patent: Feb. 25, 1986

[54] STOVE ADAPTER FOR LANTERN

[76] Inventor: David Napier, P.O. Box 311, Roark, Ky. 40979

[21] Appl. No.: 633,577

[22] Filed: Jul. 23, 1984

[51] Int. Cl.⁴ ............................................. F24C 5/04
[52] U.S. Cl. ..................................... 126/258; 126/38
[58] Field of Search ............... 126/260, 258, 256, 235, 126/47, 48, 38

[56] References Cited

U.S. PATENT DOCUMENTS

| 234,153 | 11/1980 | Walterhouse | 126/258 |
| 2,397,766 | 4/1946 | Tullis | 126/38 |
| 3,133,536 | 5/1964 | Knapp | 126/258 |
| 3,804,075 | 4/1974 | Rummel | 126/258 |
| 4,029,079 | 6/1977 | Elder | 126/258 |

Primary Examiner—William E. Lyddane
Assistant Examiner—Gerald Anderson
Attorney, Agent, or Firm—King, Liles & Schickli

[57] ABSTRACT

A stove adapter for attachment to and use with a camping lantern includes a substantially cylindrical base member having an upper cooking surface and a plurality of extension arms pivotally attached to the base member. When opened radially outwardly, the extension arms provide an enlarged cooking surface for supporting, for example, a large skillet. When retracted inwardly, the bail of the lantern swings overhead to carry the lantern and the attached stove adapter. When opened, a first portion of each extension arm extends downwardly and engages the side of the cylindrical base member to support the arm in the plane of the cooking surface. When closed, the first portion extends upwardly to provide a stop for retaining cookware on the stove adapter. An over center spring collar is also provided to maintain the extension arms in both the open and closed positions and to retain the cookware on the cooking surface when the arms are retracted.

14 Claims, 7 Drawing Figures

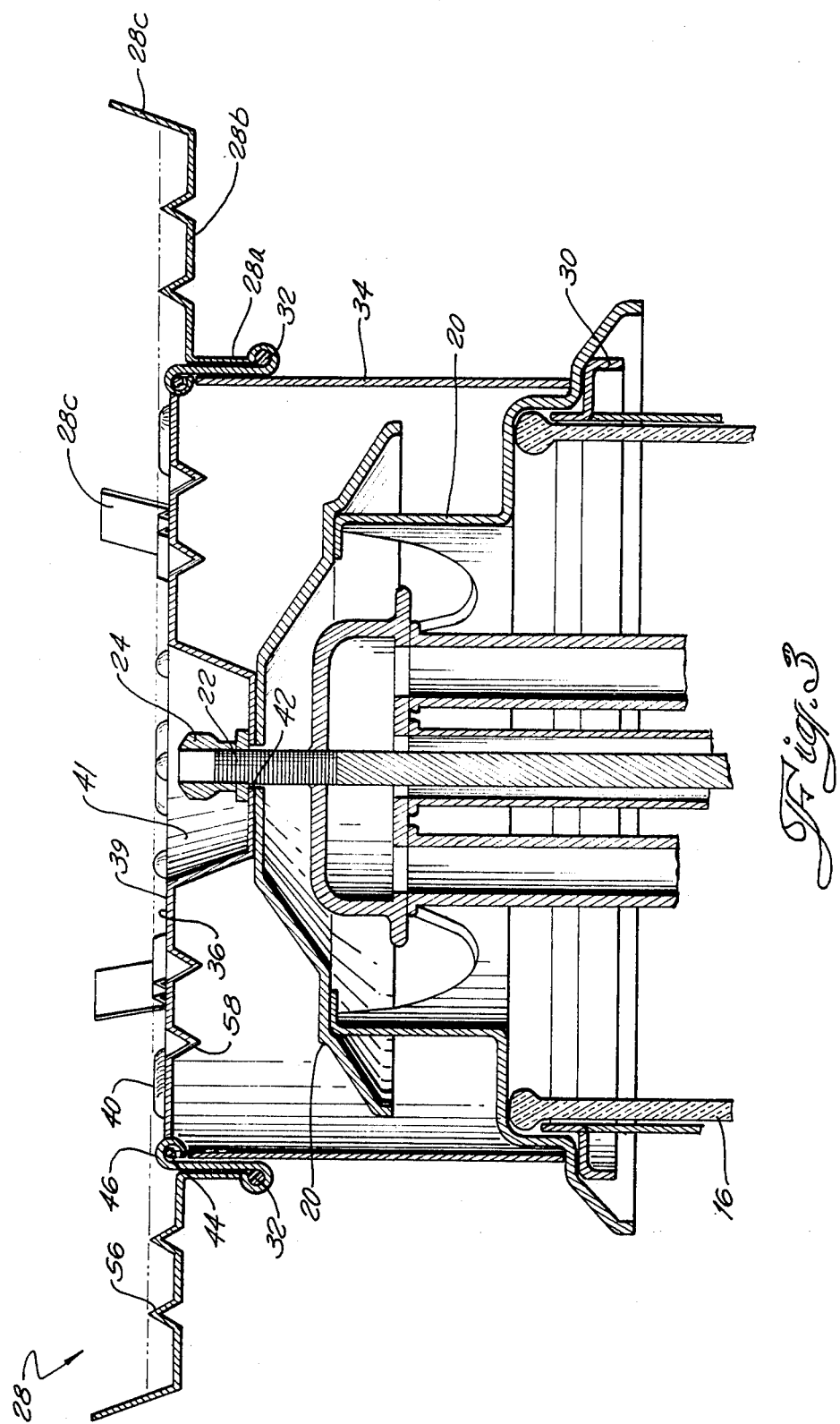

STOVE ADAPTER FOR LANTERN

BACKGROUND OF THE INVENTION

The present invention relates generally to cooking adapters and, more particularly, to a stove adapter that may be attached to a conventional camping fuel lantern.

Outdoor sports, such as hiking, backpacking and camping, are enjoyed by hundreds of thousands year after year. Others, such as, for example, fishermen and hunters, also frequently camp out overnight and therefore require light, food, drink and a comfortable place to sleep. With this in mind, it may easily be appreciated why camping equipment sales are growing so rapidly.

In camping, and particularly where substantial hiking is involved, two critical and opposing factors must be considered. On the one hand is the need of the individual for food and drink supplies as well as camping equipment, such as cooking utensils, lanterns, a tent, first aid kit, sleeping bags and the like. On the other hand, there is the consideration that there is a limit to what the individual can comfortably carry. For hikes to remote or difficult access areas in rough terrain, the need to limit the weight and bulk of the equipment and supplies becomes progressively important.

The limitations of the individual relating to the weight and bulk of the equipment that may be comfortably carried has led to the development of devices that may be used to serve more than one purpose. Portable lanterns powered by camping fuel not only give off a substantial amount of light, but also a significant amount of heat. The present invention conveniently adapts a lantern of this type for the purposes of cooking, thereby eliminating the need for a separate camping stove. Of course, advantageously, the elimination of the camping stove reduces the weight of the backpack and/or creates more room for essential food and water supplies and other essential equipment.

The fact that lanterns generate sufficient heat for cooking has been previously recognized and apparatus adapting lanterns for cooking are known in the art. Examples of such apparatus are shown in U.S. Pat. Nos., 234,153 to Walterhouse, Sr.; 3,133,536 to Knapp; 3,804,075 to Rummel; and 4,029,079 to Elder. As should be appreciated from the following discussion, however, there is still a need for an improved stove attachment for a lantern. The Walterhouse patent discloses a stove attachment for a lantern including rigid, outwardly extending legs. These legs provide an enlarged supporting surface that greatly reduces the possibility of cookware, such as a skillet, from tipping over the edge of the stove attachment. The outwardly extending legs, however, engage and prevent the standard lantern bail from swinging overhead for carrying the lantern. The lantern is bulky and cumbersome and thus difficult to carry in a backpack or other carrying device. The arms of the attachment have the tendency to hang and become entangled in other objects.

The Knapp patent overcomes one problem with the Walterhouse patent by providing a stove attachment for a lantern of reduced diameter. As should be appreciated, this attachment allows the bail of the lantern to swing overhead for carrying the combined lantern and stove. The reduced diameter of the stove attachment, however, greatly increases the possibility of cookware, such as a large skillet used by a fisherman in preparing his catch, tipping from the stove and spilling the hot grease and other contents of the skillet over the surrounding area and the lantern.

The Rummel patent discloses a stove attachment for a lantern that replaces the standard lantern hood and includes openings for the attachment of a bail for carrying the combined stove and lantern. This device, however, is also not without its disadvantages. In particular, it may be desirable or necessary to clean the stove attachment following a meal. This necessitates the removal of the stove attachment from the lantern. Since the stove attachment replaces the hood of the lantern, its removal means that the top of the lantern is open. This greatly increases the possibility of a fire should the lamp be accidentally tipped over. Further, the open top affects the draft of the lamp and interferes with proper combustion of the fuel at the burner or mantle, thereby reducing the amount of light thrown by the lantern and possibly damaging the mantle.

Finally, the Elder patent discloses a stove attachment for a conventional lantern including a skirt, a stove surface and a shield. The skirt fits over the draft hood of the lantern and the stove surface fits over the skirt with the shield secured to the back of the stove surface. The Elder stove attachment, like the Rummel and Knapp attachments, fails to provide a cooking surface of large diameter for supporting larger cookware and preventing accidental tipping of the cookware from the stove. Additionally, it should be noted that in fact the Elder stove attachment tends to promote tipping as an extension is provided only along one side, i.e. the portion of the circumference of the stove surface receiving the shield.

SUMMARY OF THE INVENTION

Accordingly, it is a primary object of the present invention to provide an improved stove adapter for a lantern, such as a camping fuel lantern used in camping, overcoming the above-described limitations and disadvantages of the prior art.

Another object of the present invention is to provide a stove adapter for a camping fuel lantern that may be easily attached to the lantern.

Another object of the present invention is to provide a stove adapter that may be easily attached to a lantern in alternative ways depending on the amount of heat required.

Still another object of the present invention is to provide a stove adapter for a camping lantern having a cooking surface of adjustable size to meet the needs of the individual camper and aid in preventing tipping of the lantern.

A further object of the present invention is to provide a stove adapter for a camping lantern that provides an enlarged cooking surface for supporting a large cooking vessel while also allowing the standard lantern bail to pass overhead for carrying the lantern and adapter.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

To achieve the foregoing and other objects, and in accordance with the purposes of the present invention as described herein, an improved stove adapter is provided for attachment to a camping fuel lantern, such as that manufactured by the Coleman Company, including a fuel reservoir, a glass globe enclosing a mantle and a central threaded stem for a removable draft hood. The stove adapter includes a substantially cylindrical base member having an upper cooking surface. Means for attaching the base member to the lantern include a central recessed portion substantially frusto-conical in shape in the cooking surface. A centrally located aperture in the recessed portion allows connection of the base member of the stove adapter to the central threaded stem of the lantern.

A plurality of extension arms are also provided pivotally connected to the base member. Each arm may be pivoted radially outwardly from the base member into an open position so as to enlarge the cooking surface for supporting, for example, a large skillet. Conversely, the arms may be pivoted inwardly to overlie the cooking surface of the base member and assume a retracted position allowing the bail of the lantern to swing overhead for carrying the combined lantern and stove apparatus.

Each extension arm is pivotally connected to the base member by means of an integral loop portion. The loop portion is attached by cooperating pins integrally formed around the rim of the base member. The extension arms are preferably made of a lightweight but strong metal with the loop portion of a narrower width than the remainder of the arm.

Preferably, the extension arms are substantially S-shaped comprising three additional separate portions. The first portion adjacent the loop portion or pivotal connection of the extension arm to the cylindrical base member extends upwardly substantially perpendicular to the cooking surface when the extension arm is in the retracted position. Thus, advantageously, in the retracted position the first portion of the extension arm provides an inner stop for maintaining small cookware, such as a coffee pot, on the stove surface. When the extension arm is in the open position, the first portion extends downwardly substantially perpendicular to the cooking surface so as to engage the cylindrical base member in a longitudinal direction and support the arms in the extended position.

The second portion of each extension arm overlies the cooking surface when in the retracted position and extends radially outwardly from the base member in the same plane as the cooking surface when in the open position. Thus, the second portion provides an enlarged cooking surface for supporting larger pots and skillets and preventing them from tipping from the cooking surface and spilling the contents.

The third portion of each extension arm is connected to the second portion at the distal end. When the extension arm is in the open position, the third portion extends upwardly so as to provide an outer stop for maintaining larger cookware on the enlarged cooking surface of the stove adapter.

The upper cooking surface of the stove includes a series of openings and ribs with separate raised areas on the cooking surface allowing the passage of heat from the lantern directly to the cookware positioned on the stove adapter. These openings also allow the proper draft to the lantern for efficient and smooth burning of the fuel by the mantle. Further, they prevent the heat from building up in the lantern, thereby preventing any possible damage to the lantern occurring.

The extension arms are held in position by a resilient means, such as an over-center spring collar. This spring collar is received in an opening in the first portion of each extension arm opposite the pivotal connection of the extension arm to the base member. Advantageously, the spring collar positively maintains the extension arms in both the open and retracted positions. Additionally, the spring collar is spaced above and extends around the periphery of the cooking surface when the arms are retracted so as to retain the cookware in its proper orientation on the stove adapter.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects, all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrates several aspects of the present invention, and together with the description serves to explain the principles of the invention. In the drawing:

FIG. 3 is a cross-sectional view of the stove adapter of the present invention connected to the top of the lantern and enclosing the draft hood of the lantern;

Reference will now be made in detail to the present preferred embodiment of the invention, an example of which is illustrated in the accompanying drawing. FIGS. 1 and 2 show an inproved stove adapter 10 attachable to a common camping lantern in order to provide a cooking surface, thereby eliminating the need to backpack a camping stove. Advantageously, this lightens the load that the individual camper must carry and creates additional space for other camping supplies such as food and water.

As shown in FIGS. 1 and 2, the stove adapter 10 is connected to a conventional lantern 12 having a camping fuel reservoir 14, a glass globe 16 enclosing a mantle 18, a draft hood 20, a central threaded stem 22 for the hood, and a fastening nut 24. The lantern 12 also includes a bail 26 that swings directly over the top of the lantern for ease of carrying.

In FIG. 1, the stove adapter 10 is shown attached to the lantern 12 and resting on the hood 20. The extension arms 28 extend radially and are shown in the open position so as to provide a cooking surface of enlarged area for supporting, for example, a skillet.

In FIG. 2, the stove adapter 10 is shown attached to the lantern 12, but the draft hood 20 is removed from the lantern. Thus, the stove adapter 10 rests on the support ring 30 adjacent the top of the glass globe 16. The removal of the draft hood 20 allows greater heat from the lantern to reach the cooking surface provided by the stove adapter 10. Thus, cooking tasks such as the boiling of water for purification or mixing with freeze-dried camping food may be performed more quickly. Further, the extension arms 28 are shown in the retracted position. In this position, the spring collar 32 connecting the extension arms 28 forms a side stop for retaining cookware on the cooking surface. It should also be recognized that the bail 26 is free to swing over the top of the retracted extension arms for carrying the combined stove and lantern.

As shown in FIG. 3, the stove adapter includes a cylindrical base member 34. The lower end of the base member 34 is open for receipt on the lantern 12. As described above with respect to FIG. 1, the lower end of the cylindrical base member 34 rests upon the draft hood 20 of the lantern 12. As described above with respect to FIG. 2, the lower end of the base member 34 rests securely upon the support member 30 when the draft hood 20 is removed.

Figure 4:
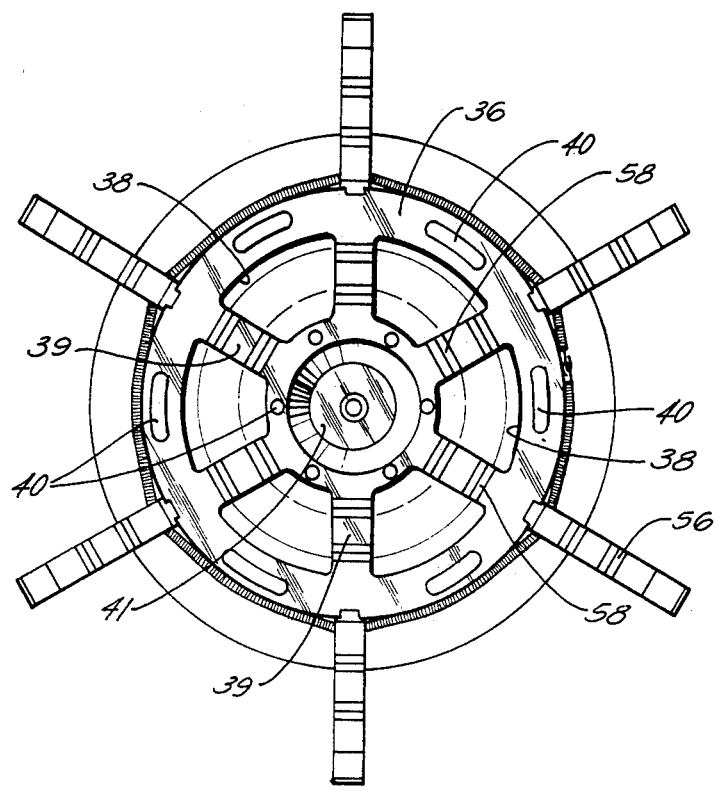
FIG. 4 is a top plan view of the stove adapter of the present invention with the extension arms in the open position.

The upper end of the cylindrical base member includes an integral cooking surface 36, shown in FIGS. 3 and 4. The cooking surface 36 includes a plurality of openings 38 and spaced ribs 39. Raised pads 40 are also provided on the cooking surface 36. Together, the openings 38 and raised pads 40 allow the passage of heat from the lantern directly to cookware positioned on the stove adapter 10.

The cooking surface 34 also includes a central recessed portion 41. The recessed portion 41 is substantially frusto-conical in shape so as to receive the third portion or ends 28c of the extension arms 28 when in the retracted position (see FIGS. 2 and 4A). The recessed portion 41 also includes a central aperture 42. The stove adapter 10 is positioned on the lantern 12 by removing the draft hood fastening nut 24 and positioning the stove adapter 10 so that the threaded stem 22 of the lantern is received in the aperture 42. The fastening nut 24 is then resecured to retain the stove adapter 10 in position. Of course, as previously indicated, this may be done with or without the draft hood 20 on the lantern 12, depending on the specific heat requirements of the user.

Figure 6:
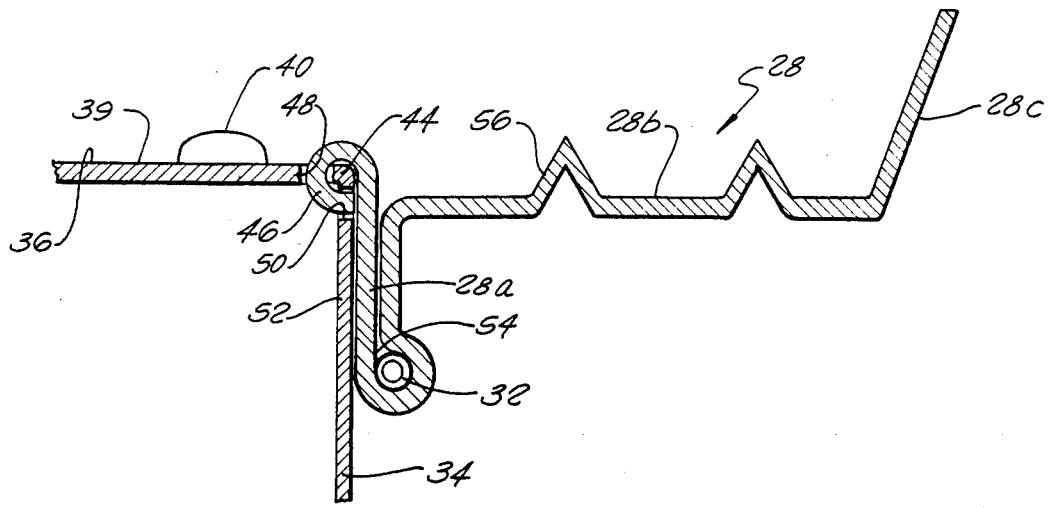
FIG. 6 is a detailed cross-sectional view showing a pivotal extension arm of the stove adapter of the present invention.

As best shown in FIG. 6, each extension arm 28 is pivotally secured to the cylindrical base member 34 by top edge pin 44. As shown, the pivotal connection to the pin is provided by a loop portion 46 of each extension arm 28. Cooperating slots 48 and 50 in the cooking surface 36 and side wall 52 of the base member 34, respectively, form the pivot pin 44.

Each extension arm 28 also includes a first portion 28a. The first portion 28a extends downwardly substantially perpendicular to the cooking surface 36 when the extension arm 28 is in the open position. Thus, when opened, the first portion 28a engages the side wall 52 of base member 34 in a longitudinal direction, thereby supporting the extension arms 28.

Figure 2:
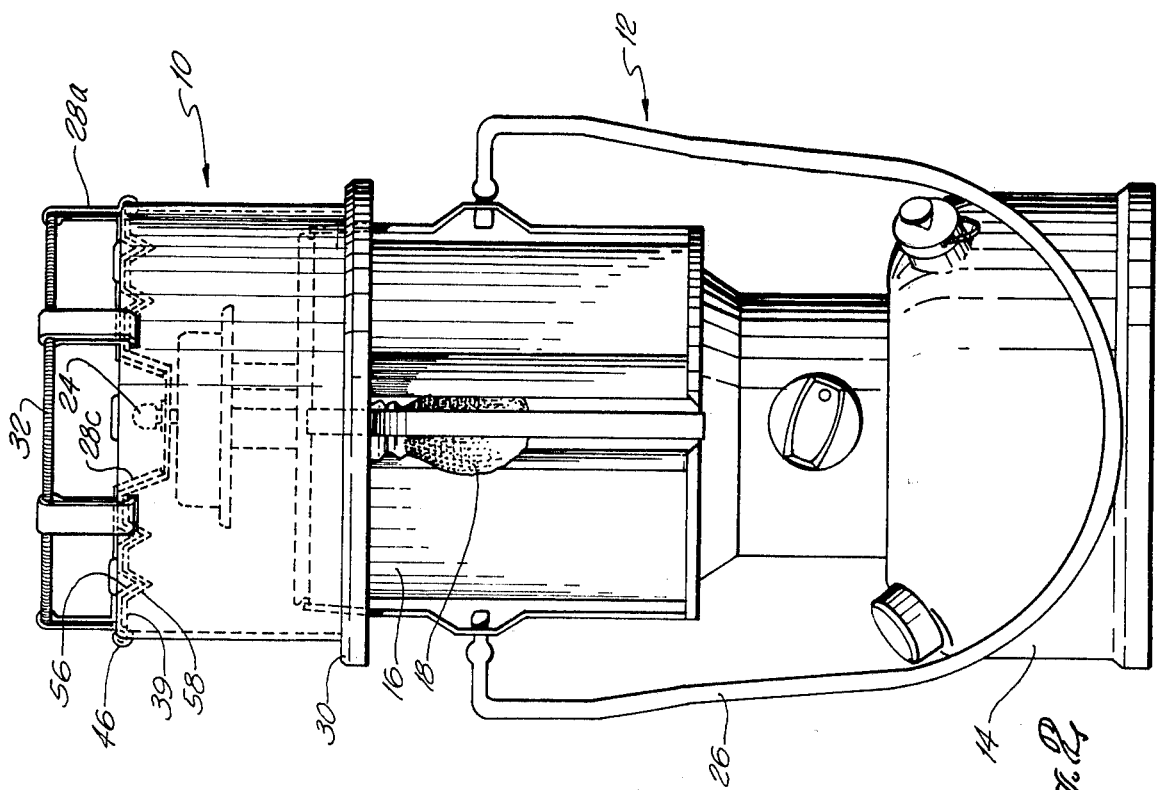
FIG. 2 is a side elevational view similar to FIG. 1 but showing the extension arms of the stove adapter of the present invention in the retracted position and the draft hood of the lantern removed for speed heating.
Figure 1:
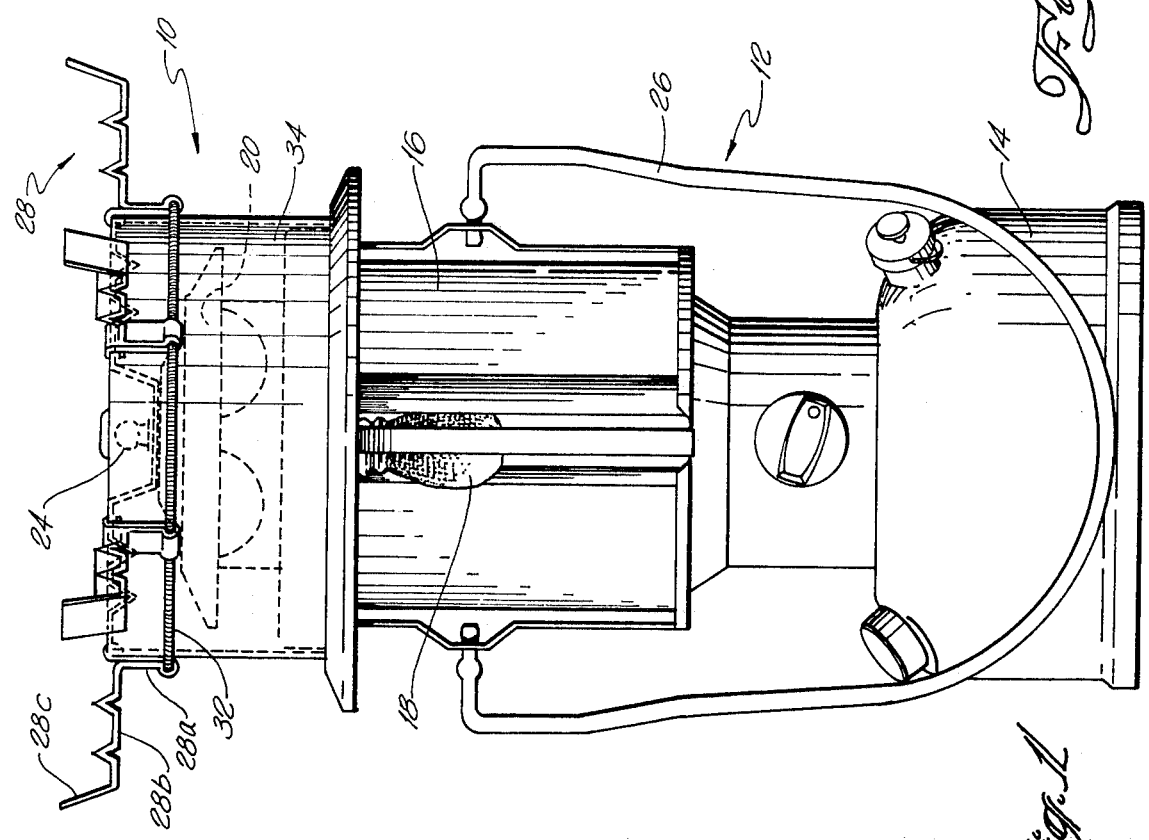
FIG. 1 is a side elevational view of the stove adapter of the present invention attached to a camping fuel lantern and having the extension arms in the open position.
Figure 4A:
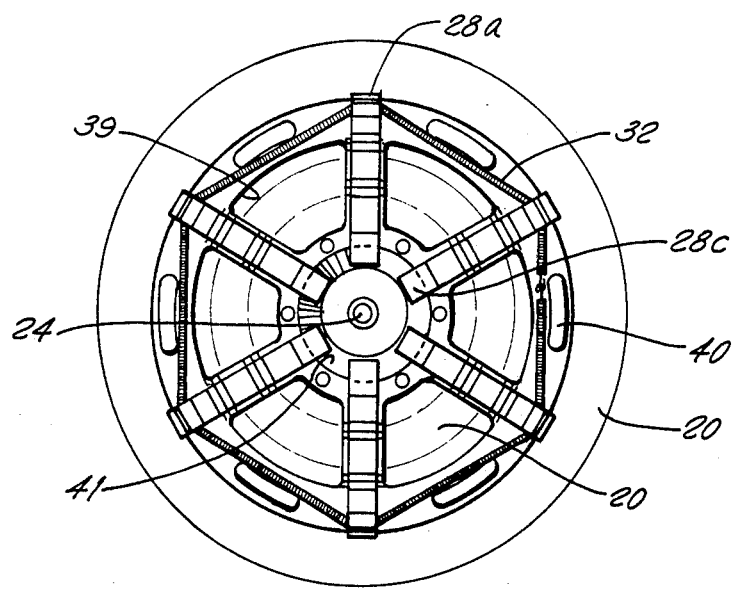
FIG. 4A is a top plan view of the stove adapter of the present invention with the extension arms in the retracted position.
Figure 5:
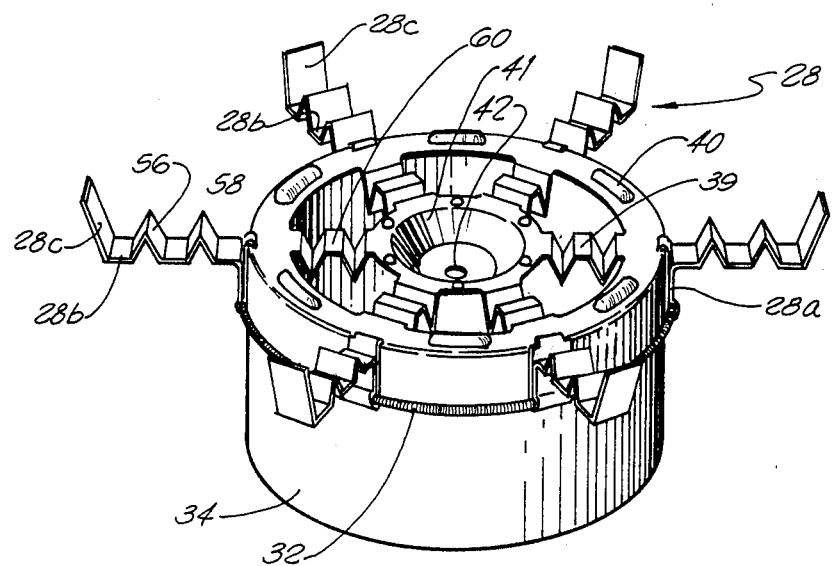
FIG. 5 is a perspective view of the stove adapter of the present invention.

An opening 54 is also provided in the first portion 28a of each extension arm 28. The previously referred to over center spring collar 32 is received in each opening 54 so as to serially connect the extension arms 28. The spring 32 serves to positively maintain the extension arms 28 in both the open and retracted positions. As shown in FIGS. 1, 4 and 5, when the extension arms 28 are in the open position, the spring 32 pulls the first portion 28a of each extension arm into tight contact with the side wall 52 of base member 34, thereby providing a positive force for retaining the extension arms open. When the extension arms 28 are closed as shown in FIGS. 2 and 4A, the spring 32 again serves to pull the first portion 28a of each extension arm 28 toward the center of the stove adapter 10, thereby retaining the arms in the retracted position. Of course, the spring 32 also serves as a retaining collar by forming a continuous side band spaced above and running around the periphery of the cooking surface 36.

Each arm 28 also includes a second portion 28b. When in the open position, the second portion 28b extends radially outwardly from the base member 34 in substantially the same plane as the cooking surface 36. Further, raised points 56 are provided to match the height of raised projections 40 of cooking surface 36 so as to form a level cooking surface. When the extension arms are retracted, the raised points 56 are received in indentations 58 in the ribs 39 of the cooking surface 36. Thus, when retracted and nested in this manner, the second portion 28b of each arm 28 directly overlies and contacts the ribs 39. The surface of the arms 28 are now at the same height as the projections 40 and thus together these surfaces provide a flat surface from which to cook.

Lastly, each extension arm also includes a third portion 28c connected to the end of the second portion 28b opposite the connection to the first portion 28a. When the extension arms 28 are open, the third portion 28c extends upwardly to provide an outer stop for maintaining cookware on the stove adapter. When closed, the angle of the third portion 28c relative to the second portion 28b is substantially identical to the slope angle of the frusto-conical central recess 41 in the cooking surface 36. Thus, the third portion 28c of each extension arm 28 drops down into the recess while still allowing room to loosen the fastening nut 24 for removal of the stove adapter 10 from the lantern 12.

In summary, numerous benefits have been described which result from employing the concepts of the present invention. The pivotal connection of the extension arms 28 to the stove adapter 10 allow the adjustment of the circumference of the cooking surface to match the cookware being used. This is true whether the cookware is a large skillet as, for example, used in cooking fish or a small pot for boiling water. Additionally, when in the retracted position, the extension arms allow the passage of the bail 26 over the lantern. Thus, the standard lantern bail 26 may be used to carry the combined stove adapter 10 and lantern 12 without any modification. Advantageously, the stove adapter 10 may be used in conjunction with the lantern 12 with or without the draft hood 20 in position. Further, an over center spring collar 32 may be provided to positively retain the extension arms 28 in the open or closed position. This makes the stove adapter 10 easier to use on the lantern 12 and aids in preventing the extension arms 28 from flipping open and becoming entangled in other equipment in the backpack during packing or while on the hike.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

I claim:

1. A stove adapter for attachment to a camping fuel lantern including a bail, comprising:

a substantially cylindrical base member including an upper cooking surface;

means for attaching said base member to the lantern; and a plurality of substantially S-shaped extension arms pivotally connected to said base member; said arms extending outwardly from said base member when extended to assume an open position to enlarge said cooking surface; said arms pivoting inwardly to overlie said upper cooking surface of said base member to assume a retracted position to allow the bail to swing overhead for carrying the combined lantern and stove apparatus; and wherein each of said S-shaped extension arms comprises three portions; the first portion adjacent the pivotal connection of said extension arm to said cylindrical base member extending upwardly substantially perpendicular to said cooking surface when said extension arm is in said retracted position so as to provide an inner stop for maintaining cookware on the stove apparatus, said first portion extending downwardly substantially perpendicular to said cooking surface when said extension arms are in the open position so as to engage the cylindrical base member in a longitudinal direction and support said arms; the second portion overlying said cooking surface when in the retracted position and extending radially outwardly from said base member in the same plane as said cooking surface when in the open position so as to provide an enlarged cooking surface; and the third portion connecting to said second portion at an end opposite said first portion and extending upwardly when said extension arm is in the open position so as to provide an outer stop for maintaining cookware on the stove adapter.

2. The stove adapter of claim 1, further including resilient means, said resilient means being received in an opening in said first portion of each extension arm opposite the pivotal connection of said extension arm to said base member.

3. The stove adapter of claim 2, wherein said resilient means comprises an over center spring collar for positively maintaining the extension arms in both the open and retracted positions and retaining cookware on the cooking surface when in the retracted position.

4. The stove adapter of claim 1, wherein said cooking surface includes a central recess portion substantially frusto-conical in shape, said recess portion receiving said third portion of said extension arms when said arms are in the retracted position.

5. A stove adapter for attachment to a camping fuel lantern including a bail, comprising:

a substantially cylindrical base member including an upper cooking surface;

means for attaching said base member to the lantern;

a plurality of extension arms pivotally connected to said base member; said arms extending outwardly from said base member when extended to assume an open position to enlarge said cooking surface; said arms pivoting inwardly to overlie said upper cooking surface of said base member to assume a retracted position to allow the bail to swing overhead for carrying the combined lantern and stove apparatus; and a means connected to each extension arm for maintaining said arms alternatively in the open and retracted positions and for retaining cookware on the cooking surface when in the retracted position.

6. The stove adapter of claim 5, wherein said maintaining and retaining means is resilient.

7. The stove adapter of claim 6, wherein said resilient maintaining and retaining means is received in an opening in a first portion of each extension arm opposite the pivotal connection of said extension arm to said base member.

8. The stove adapter of claim 7, wherein said resilient maintaining and retaining means comprises an over center spring collar.

9. The stove adapter of claim 5, wherein each extension arm includes a loop portion, said loop portion being received by a pin formed by cooperating slots in said base member, thereby providing the pivotal connection between said extension arm and said base member.

10. The stove adapter of claim 5, wherein each of said extension arms is substantially S-shaped.

11. The stove adapter of claim 5, wherein each said loop portion is a reduced width portion of said extension arm.

12. The stove adapter of Claim 5, wherein said upper cooking surface includes a series of openings and ribs with raised areas on the ribs allowing the passage of heat from the lantern directly to cookware positioned on the stove adapter.

13. The stove adapter of Claim 5, wherein said attaching means includes a central aperture receiving a threaded stem of the lantern.

14. The stove adapter of claim 13 wherein said central aperture is formed in a central recess in said cooking surface.

* * * * *